(12) United States Patent
Griffioen

(10) Patent No.: US 10,305,266 B2
(45) Date of Patent: May 28, 2019

(54) METHOD FOR INSTALLING AN ELONGATED ELEMENT INTO A BENDED DUCT

(71) Applicant: PLUMETTAZ Holding S.A., Bex (CH)

(72) Inventor: Willem Griffioen, Ter Aar (NL)

(73) Assignee: PLUMETTAZ Holding S.A., Bex (CH)

( * ) Notice: Subject to any disclaimer, the term of this patent is extended or adjusted under 35 U.S.C. 154(b) by 0 days.

(21) Appl. No.: 15/111,522

(22) PCT Filed: Feb. 17, 2015

(86) PCT No.: PCT/EP2015/053293
§ 371 (c)(1),
(2) Date: Jul. 14, 2016

(87) PCT Pub. No.: WO2015/121493
PCT Pub. Date: Aug. 20, 2015

(65) Prior Publication Data
US 2016/0352085 A1    Dec. 1, 2016

(30) Foreign Application Priority Data
Feb. 17, 2014    (CH) ........................................ 206/14

(51) Int. Cl.
*H02G 1/08*    (2006.01)
(52) U.S. Cl.
CPC .............. *H02G 1/086* (2013.01); *H02G 1/08* (2013.01)
(58) Field of Classification Search
CPC ............. H02G 1/086; H02G 9/00; H02G 9/12
(Continued)

(56) References Cited

U.S. PATENT DOCUMENTS

| | | | | | |
|---|---|---|---|---|---|
| 3,006,607 | A | * | 10/1961 | Hamrick | ................ B65H 55/00 |
| | | | | | 242/168 |
| 3,034,766 | A | * | 5/1962 | Hamrick | ................ H02G 1/085 |
| | | | | | 242/125.2 |

(Continued)

FOREIGN PATENT DOCUMENTS

| DE | 29505241 U1 * | 7/1996 | ........... G02B 6/4464 |
|---|---|---|---|
| EP | 0162543 | 11/1985 | |

(Continued)

OTHER PUBLICATIONS

International Search Report and Written Opinion for International Application No. PCT/EP2015/053293 dated Apr. 17, 2015.

(Continued)

*Primary Examiner* — Joseph J Hail
*Assistant Examiner* — Arman Milanian
(74) *Attorney, Agent, or Firm* — Patterson Thuente Pedersen, P.A.

(57) ABSTRACT

A method for operating an elongated element through a full length of a bended duct being bended over a major part of its length, the method comprising the steps consisting in:
  introducing a liquid into the bended duct and maintaining predetermined flow and pressure conditions of the liquid into the bended duct,
  compensating a friction between the bended duct and an end of the elongated element being bended by the bended duct, by locally applying a predetermined axial effort to the end of the elongated element.

22 Claims, 4 Drawing Sheets

(58) Field of Classification Search
USPC .................................................. 254/134.4
See application file for complete search history.

(56) References Cited

U.S. PATENT DOCUMENTS

| | | | | |
|---|---|---|---|---|
| 3,374,535 A * | 3/1968 | Tranel | ............... | H02G 1/086 |
| | | | | 226/91 |
| 4,185,809 A * | 1/1980 | Jonnes | ............... | B66F 19/00 |
| | | | | 254/134.4 |
| 4,202,531 A * | 5/1980 | Hamrick | ............... | B29C 63/36 |
| | | | | 254/134.4 |
| 5,156,376 A * | 10/1992 | Spicer | ............... | G02B 6/4464 |
| | | | | 254/134.4 |
| 5,197,715 A * | 3/1993 | Griffioen | ............... | G02B 6/4463 |
| | | | | 254/134.4 |
| 5,474,277 A * | 12/1995 | Griffioen | ............... | G02B 6/4463 |
| | | | | 254/134.4 |
| 5,699,996 A * | 12/1997 | Boyle | ............... | H02G 1/086 |
| | | | | 254/134.3 FT |
| 5,762,321 A * | 6/1998 | Petersen | ............... | G02B 6/4464 |
| | | | | 254/134.4 |
| 5,884,384 A * | 3/1999 | Griffioen | ............... | F16L 1/028 |
| | | | | 226/97.1 |
| 5,897,103 A * | 4/1999 | Griffioen | ............... | G02B 6/4464 |
| | | | | 254/134.4 |
| 6,315,498 B1 * | 11/2001 | Baugh | ............... | E21B 4/18 |
| | | | | 166/383 |
| 6,382,875 B1 * | 5/2002 | Plumettaz | ............... | F16L 7/00 |
| | | | | 226/97.1 |
| 6,402,123 B1 * | 6/2002 | Rivard | ............... | G02B 6/4464 |
| | | | | 254/134.4 |
| 6,540,208 B1 * | 4/2003 | Pecot | ............... | G02B 6/4463 |
| | | | | 254/134.3 R |
| 7,322,421 B2 * | 1/2008 | Blacklaw | ............... | E21B 23/08 |
| | | | | 166/383 |
| 8,770,550 B2 * | 7/2014 | Plumettaz | ............... | H02G 1/086 |
| | | | | 254/134.3 FT |
| 9,287,689 B2 | 3/2016 | Plumettaz et al. | | |
| 2003/0136952 A1 | 7/2003 | Pecot et al. | | |
| 2005/0013598 A1 * | 1/2005 | Kim | ............... | F24D 13/02 |
| | | | | 392/488 |
| 2012/0267590 A1 * | 10/2012 | Plumettaz | ............... | H02G 1/086 |
| | | | | 254/134.4 |
| 2013/0299758 A1 | 11/2013 | Griffioen | | |
| 2014/0265322 A1 * | 9/2014 | Thompson | ............... | H02G 3/06 |
| | | | | 285/345 |

FOREIGN PATENT DOCUMENTS

| | | | | |
|---|---|---|---|---|
| EP | 0442626 | 8/1991 | | |
| EP | 0445858 | 9/1991 | | |
| EP | 2031719 | 3/2009 | | |
| EP | 2031719 B1 * | 1/2013 | ............... | G02B 6/387 |
| WO | WO2007034242 | 3/2007 | | |

OTHER PUBLICATIONS

Switzerland Search Report for Application No. CH00206/14 dated May 5, 2014. English translation not provided.

\* cited by examiner

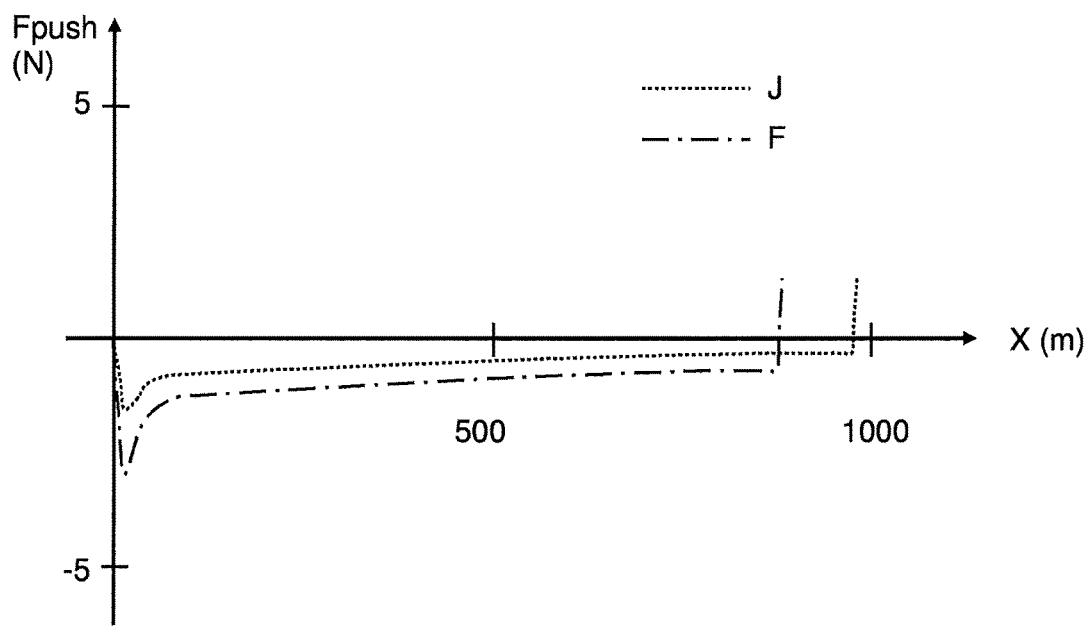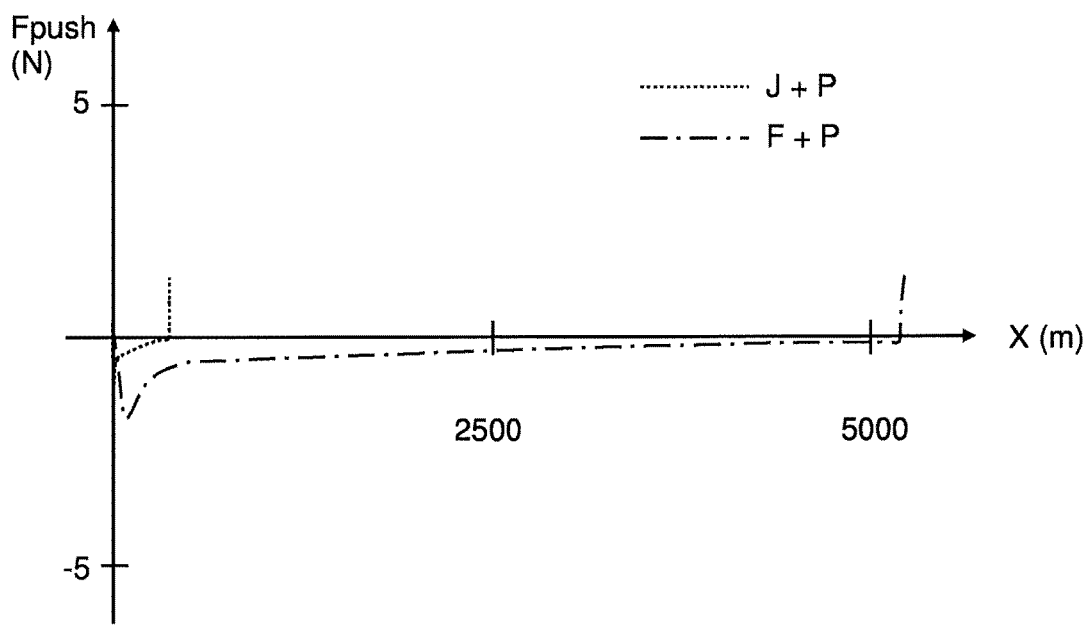

METHOD FOR INSTALLING AN ELONGATED ELEMENT INTO A BENDED DUCT

RELATED APPLICATIONS

The present application is a National Phase entry of PCT Application No. PCT/EP2015/053293, filed Feb. 17, 2015, which claims priority to CH00206/14, filed Feb. 17, 2014, the contents of each being incorporated herein by reference in their entireties.

TECHNICAL FIELD

The present invention belongs to the general technical field related to the operation of cables through pipes. This covers the laying of the cable into a pipe, as well as the removing of the cable out of the pipe. A particular case concerns the operating of an elongated element into or out of a bended duct.

BACKGROUND ART

It is known to introduce elongated elements into ducts with the help of compressed air. This method, called "jetting", is described in the document U.S. Pat. No. 5,197,715 as well as the use of a "sonic head", where "jetting" is a synergy of pushing and blowing and where at the "sonic head" a sonic flow is created, generating a pulling force at the foremost end of the cable. Blowing creates a distributed forward propelling force onto the cable, compensating locally the friction forces, limiting build-up of axial forces in the cable, in turn limiting extra exponential friction build-up by the well known "capstan effect" (See e.g. http://en.wikipedia.org/wiki/Capstan_equation). As air is a compressible fluid, it expands when the pressure decreases towards the end of the duct, resulting the air propelling forces to being relatively small in the first section of the duct (injection side) and relatively large at the last section of the duct (exhaust side). During jetting, typically there is a deficiency of air propelling forces to compensate the friction in the first section, where pushing assists the cable installation, and an excess of air propelling forces in said last section. The so-called "critical point" is the location in the duct where the air propelling forces have just become equal to the friction forces. In a situation where the cable weight is dominant for the friction (as is the case in jetting), the friction forces are mainly constant, and it is easily understood that the "critical point" is the most difficult point to reach: upstream of this point there is less length for the pushing force to build up and downstream of this point a pulling force will build up first. It shall be noted that when the cable diameter becomes close to that of the internal diameter of the duct, this reasoning does not hold anymore, because the pressure drop over the part of duct that is filled with cable will be higher because of the increased hydraulic resistance, as the hydraulic diameter is significantly reduced by the presence of the cable. For this jetting method the "sonic head" can be advantageously used. Calculation in the document U.S. Pat. No. 5,197,715 showed that the improvement is enhanced because the "sonic head" is as it were "pulling" the cable over the "critical point".

When the duct is bended with a continuous radius over a great length, the aforementioned synergy between pushing and blowing disappears: the action of axial forces in the cable is much shorter here because the afore mentioned capstan effect is much larger. In this case, the air has to do the job all by itself, and installation will only go for duct lengths short enough such that the blowing generates sufficient air propelling forces from the very beginning, which will cause the installation length to decrease by about 50%. However, for today's larger relative cable diameters the increased hydraulic resistance of the part of the duct filled with cable, helps to "pull" the cable through the most difficult first section as in this first section, the hydraulic diameter is (significantly) reduced by the presence of the cable.

Another method to introduce an elongated element is known, with the help of water, where the liquid at least partly compensates the weight of the elongated element. This method is called floating, and the operating conditions are quite different from the jetting method, especially regarding the flow and speed of the liquid injected into the duct. Indeed, the speed of the liquid is quite low compared to compressed air, and there is no expansion along the pipe. In many cases, much longer cable installation lengths can be reached in straight ducts by floating than by jetting.

However, it is still difficult to operate (i.e. to introduce or remove) elongated elements in a duct when the latter is bended with a continuous radius over a great length. A typical case is when the duct is coiled over a drum for a length, up to more than one thousand meters for some cases. Another typical case is when the duct is helically stranded with another duct or cable over its full length, for example for longer than one thousand meter. Jetting or floating always end up in a length being limited by the friction between the duct walls and the elongated element, created by the continuous bending. Calculations demonstrate that the jetting method often achieves a higher installation length than the floating method in such bended ducts, but some improvements are still needed to achieve higher and higher target installation lengths.

SUMMARY OF THE INVENTION

The present invention aims to solve the aforementioned drawbacks and is first directed to a method for operating (introducing or removing) an elongated element into or out of a bended duct, over longer lengths than the ones achieved with the known methods.

With this goal in mind, embodiments of the invention include a method for operating an elongated element through a full length of a bended duct being bended over a major part of its length, the method comprising the steps of:
introducing a liquid into the bended duct and maintaining predetermined flow and pressure conditions of the liquid into the bended duct,
compensating a friction between the bended duct and an end of the elongated element being bended by the bended duct, by applying a predetermined effort to the end of the elongated element.

The method according to embodiments includes a step of compensating the friction between the end of the elongated element and the wall of the bended duct. This compensation is an annulment of at least one part of the friction forces and is obtained by applying an axial effort to the end of the elongated element. This axial effort may be a pulling force applied at a front end if the elongated element is introduced into the bended duct, or a pushing force applied at a rear end if the elongated element is laid out of the bended duct. The first step of the method is the introduction of a liquid, as for the floating method, but the second step proposes to apply an axial force, and then the installation length is increased, in an unexpected way. The effort applied to the end of the elongated element is axial, in other words, this applied effort is nearly tangential to the bended duct, or nearly perpendicular to the radius line of the bended duct. The effort applied to the end of the elongated element is created by the flow of the injected liquid, with no external device/apparatus (such as a pulling rope for example).

According to one embodiment, the bended duct is bended with a constant bending radius over more than 90% of its length.

Advantageously, in embodiments, the step of applying the predetermined effort is achieved by steps including:
attaching a leaking plug to the end of the elongated element,
causing a pressure drop to the liquid flow at the leaking plug level, by establishing a calibrated leak of liquid through the leaking plug.

The plug is arranged to present a leak, so that the liquid is still flowing at a higher speed than the elongated element, but the invention takes advantage of the flow characteristics, to create a pressure drop at the plug level, thus creating the axial effort.

Advantageously, the predetermined effort is adjusted in relation to the bending of the bended duct and/or to a bending stiffness of the elongated element.

Advantageously, the predetermined effort is adjusted in relation to a position of the end of the elongated element in the bended duct.

Advantageously, the flow of the liquid is set to achieve a flowing speed of the liquid into the bended duct equal or greater to a travelling speed of the elongated element into the bended duct.

Advantageously, the method is a method of laying the elongated element into the bended duct, wherein the end of the elongated element is a front end of the elongated element, introduced first in an entry of the bended duct, and wherein the predetermined effort is a pulling effort.

Advantageously, the predetermined pulling effort $F_{pull}$ is set to a value in relation with (usually just a bit larger than) the friction/repulsion force $F_{frictionhead}$ at the cable head (caused by bending the stiff, initially straight, cable into the bended duct) with a leaking plug presenting a pressure drop $\Delta p_{head}$ set in relation to the bending of the duct and in relation to the bending stiffness of the elongated element, so as to respect the following formula:

$$f\sqrt{W_e^2 + \frac{F_{head}^2}{R_b^2}} - \frac{\pi D_c D_d}{4}\frac{\Delta p_{duct}}{l} \leq 0; \quad (1)$$

where:

$$F_{head} = F_{frictionhead} - F_{pull} \text{ when } F_{pull} < F_{frictionhead}; \quad (2a)$$

$$F_{head} = 0 \text{ when } F_{pull} > F_{frictionhead}; \quad (2b)$$

$$F_{frictionhead} = \frac{2Bf}{\sqrt{6(D_d - D_c)R_b^3}} + \frac{B}{2R_b^2}; \quad (3a)$$

$$F_{pull} = \frac{\pi D_d^2}{4}\Delta p_{head}; \quad (3b)$$

with $D_d$ being the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B is the stiffness of the elongated element and $R_b$ the bend-radius of the bended duct (on a drum for example).

As an alternative, the friction/repulsion force $F_{frictionhead}$ at the cable head might be measured or experimentally determined to adjust the pressure drop at the leaking plug $\Delta p_{head}$ to get a pulling force at the closest value of the friction/repulsion force $F_{frictionhead}$ as possible.

If there is no force acting onto the elongated element, the movement of the latter in a (straight) duct is achieved if:

$$\frac{\pi D_c D_d}{4}\frac{\Delta p_{duct}}{l} \geq fW_e \quad (4)$$

Advantageously, the method is a method of laying the elongated element out of the bended duct, wherein the end of the elongated element is a rear end of the elongated element, last laid out of the bended duct, and wherein the predetermined effort is a pushing effort.

Advantageously, the predetermined pushing effort is set with a leaking plug presenting a pressure drop $\Delta p_{head}$ set in relation to the friction/propulsion force at the cable rear end caused by unbending of the stiff, initially straight, cable through the bended duct, (in other words, the pressure drop $\Delta p_{head}$ is set in relation to the bending radius of the duct and in relation to the bending stiffness of the elongated element) so as to respect the following formula:

$$f\sqrt{W_e^2 + \frac{F_{head}^2}{R_b^2}} - \frac{\pi D_c D_d}{4}\frac{\Delta p_{duct}}{l} \leq 0; \quad (10)$$

where:

$$F_{head} = F_{frictionrear} - F_{push} \text{ when } F_{push} < F_{frictionrear} \quad (12a)$$

$$F_{head} = 0 \text{ when } F_{push} > F_{frictionrear} \quad (12b)$$

$$F_{frictionrear} = \frac{2Bf}{\sqrt{6(D_d - D_c)R_b^3}} - \frac{B}{2R_b^2}; \quad (13a)$$

$$F_{push} = \frac{\pi D_d^2}{4}\Delta p_{head} \quad (13b)$$

with $F_{push}$ being the predetermined pushing effort, $F_{frictionrear}$ the friction/propulsion force at the cable rear end, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

Advantageously, the method comprises an initial step consisting in coiling the bended duct onto a drum to bend it over its length, before operating the elongated element into the bended duct.

Advantageously, the method comprises an initial step consisting in helically stranding the bended duct with a cable or another duct to form a stranded element, before operating the elongated element into the bended duct.

Advantageously, the method comprises an initial step consisting in bending the bended duct with an effective radius greater than 5° per meter of bended duct, and preferably with an effective radius greater than 20° per meter of bended duct.

A second aspect of embodiments of the invention is a use of a leaking plug to implement the method according to the first aspect.

Advantageously, the calibrated leak is defined by a passage between a rear end and a front end of the leaking plug, the passage having a predetermined cross section to set a predetermined flow of liquid between the rear end and the front end of the leaking plug.

Advantageously, the leaking plug comprises:
  a passage between a rear end and a front end of the leaking plug, the passage having a predetermined cross section
  a moveable piston arranged to block at least partially a liquid flow through the predetermined cross section of the passage,
  an elastic element arranged to maintain the moveable piston at a position in the passage so that a minimum pressure drop is created by the flow of the liquid between the rear end and the front end of the leaking plug.

BRIEF DESCRIPTION OF THE DRAWINGS

Other characteristics and advantages of the present invention will appear more clearly from the following detailed description of particular non-limitative examples of the invention, illustrated by the appended drawings where:

FIG. 3 represents a comparative graph of introduced lengths of an elongated element into a bended duct, using the known jetting and floating methods applied to a first specific example;

FIG. 4 represents a comparative graph of introduced lengths of the elongated element into the bended duct of the first specific example, using the jetting and floating methods with a step of applying an axial effort to the front end of the elongated element;

DETAILED DESCRIPTION

In the present application, it is referred to elongated elements, which may be for example, cables, electric cables, optical fibers or cables, temperature sensing optic fibers or cables. All these elongated elements may comprise for example a core, a coating, or a sheath. However, the wording elongated element is not limited to any of these specific examples.

It is also referred to ducts, which may be for example pipes, hollow cylinders, tubes, conduits: anything defining a channel in which an elongated element may be laid in or out, from a first location to a second location.

Figure 1:
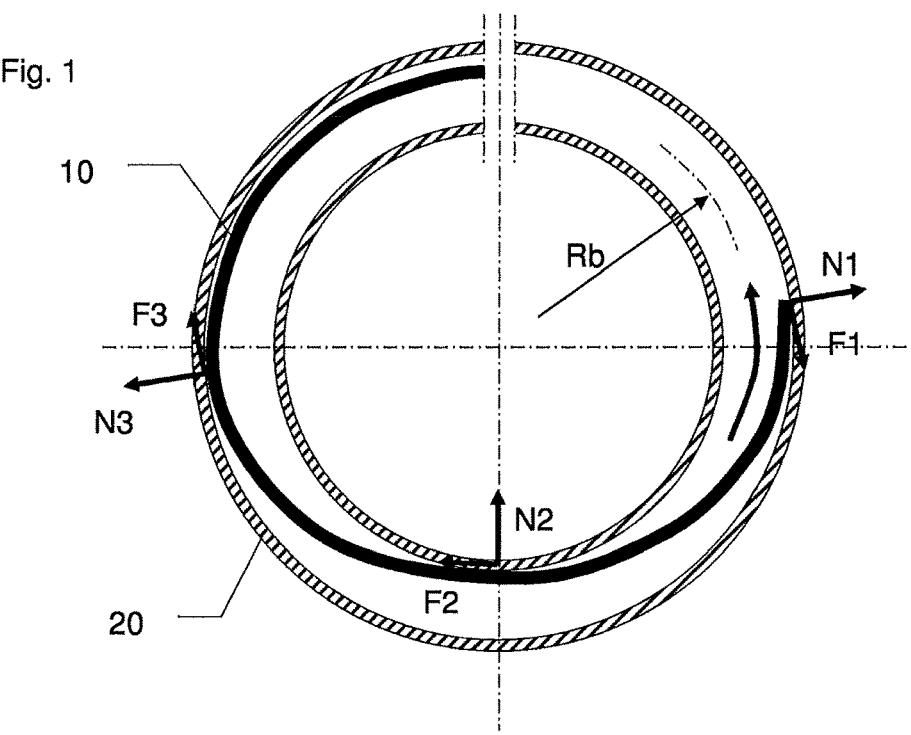
FIG. 1 represents the introducing of an elongated element in a bended duct with a known process of jetting.

FIG. 1 represents an elongated element 10 being introduced into a bended duct 20. This bended duct 20 presents a bending radius Rb, as being coiled on a drum for example.

The elongated element 10 having a specific bending stiffness, its front end touches the wall of the bended duct 20 in (two or) three different contact points. At each of these contact points, the front end of the elongated element 10 applies normal forces N1, N2, N3 onto the wall of the bended duct 20. Due to these contacts, there are friction forces F1, F2, F3 at each of the contact points, which act against the movement of the elongated element. Even if the elongated element is introduced into the bended duct 20 with the help of compressed air, the friction forces F1, F2, F3 will affect negatively the maximum length that can be reached, compared to the laying of the same elongated element 10 in a straight duct. The friction force F1, F2 and F3 can be as large as the friction forces due to the cable weight of that of a significant length of cable (tens of meters). In straight trajectories, excess air propelling forces built-up in a larger section of the cable will help to compensate for this. But, in the case of a coiled duct, where already many degrees of angle have been built-up, the forces F1, F2 and F3 will "explode" because of the capstan effect increases more and more (exponentially) as the elongated element is moving forward into the coil.

Figure 2:
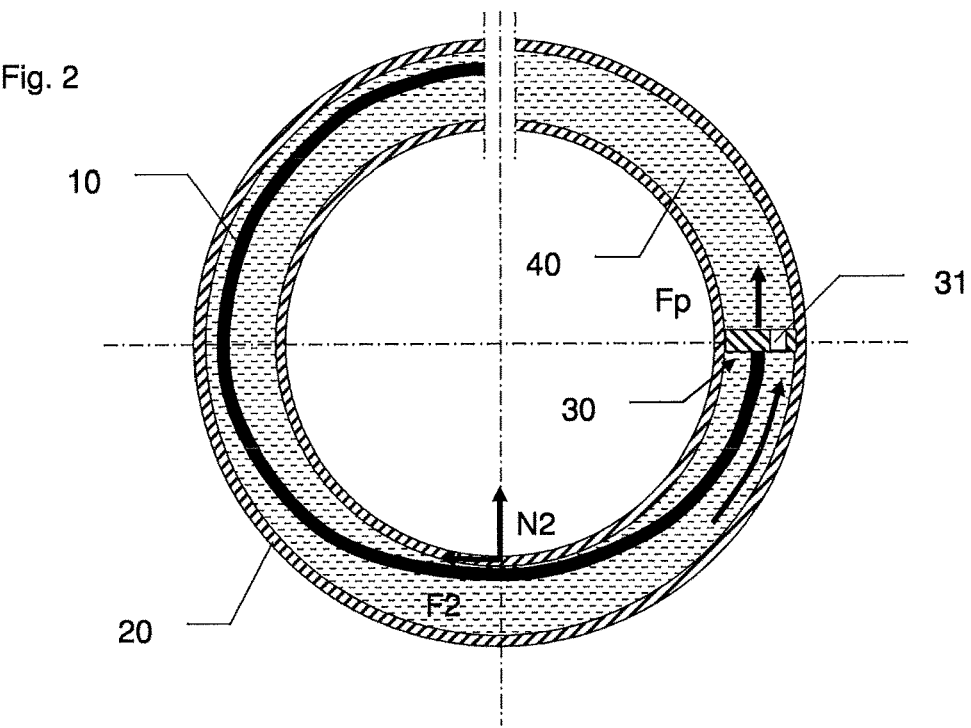
FIG. 2 represents the introducing of elongated element of FIG. 1 with the method of embodiments of the present invention.

The FIG. 2 represents the laying of the elongated element 10 into the bended duct 20 of FIG. 1, but using a method in accordance with an embodiment of the present invention. The bended duct 20 is filled in with a liquid, water 40, injected under pressure into the bended duct 20. The water 40 is flowing into the bended duct 20 so that its speed is greater than the speed of the elongated element 10, thus creating drag forces onto the elongated element 10.

In addition to the known floating process, embodiments of the invention propose to apply an axial pulling force Fp at the front end of the elongated element 10. Axial pulling force Fp means that, in a projection plane perpendicular to the axis of the helix of the bended duct 20, the pulling force Fp is nearly tangent to the trajectory of the end of the elongated element 10, or nearly perpendicular to the radius line joining the center of the bended duct 20 to the end of the elongated element 10.

A leaking plug 30 (simplified for keeping the FIG. 2 clear, for details of the leaking plug 30, see FIGS. 7a & 7b), is attached to the front end of the elongated element 10, and comprises a hole 31, so that a pressure drop is created at the leaking plug 30 level, so that the axial effort Fp is applied to the elongated element 10.

This axial pulling force Fp applied to the front end of the elongated element 10 is compensating friction between the front end of the elongated element 10 and the wall of the bended duct 20. Now, as a bonus effect to the compensation of the front end friction forces, the "capstan effect" is not causing anymore the friction forces F1 and F2 (F3 disappeared because the cable will now not anymore be under pushing force) to explode, thus allowing the introduction of the elongated element over a longer length of the bended duct 20.

Specific Example 1

An optical cable (the elongated element) with a diameter of 5.4 mm, a weight of 0.25 N/m, a bending stiffness of 0.03

Nm2 and an intrinsic curvature of 0.4 m has to be installed into a 10/7.6 mm microduct, which is helically stranded with winding radius of 25 mm and pitch of 0.75 m around an energy cable, laid in a straight line. The effective bend radius of the helix is 0.59 m, so the intrinsic curvature of the cable is the most critical for the friction force at the cable's foremost end. The coefficient of friction (COF) between cable and microduct is set at 0.1, so the friction force at the cable's foremost end will be 0.28 N (a length of 11.2 m of cable would give the same friction due to weight only, but then the cable has already made a cumulative angle of 1088°). The target installation length is 1200 m with a pressure of 12 bars. Calculation is done with a software based on the theory of published book from W. Griffioen: "Installation of optical cables in ducts" (Plumettaz, Bex, C H 1993) and an inverse fill factor (from "Microduct cabling: Fiber to the Home", W. Griffioen, A. van Wingerden, C. van't Hul, M. Keijzer, Proceedings at 52nd IWCS—2003, 431-437) of 0.1. For a given length of the microduct (open at its end) the pushing force (at the cable insertion side) is calculated as a function of installed length of the cable. When the microduct is open at 900 m, the cable can just be installed by jetting, as can be seen in FIG. 3, curve J. Floating, which in normal trajectories gives longer installation length will not go until the end for this case. With floating only 836 m is reached, see FIG. 3, curve F. This surprising result can be explained by the fact that for floating, reaching the end is the most difficult part. It does not benefit from excess forces of expanded fluid, as is the case with jetting, so it also does not help that in the first installed section the fluid propelling forces are bigger because of the increased hydraulic resistance of the duct section with cable. And, there is no benefit anymore of the lower effective weight of the cable in water: the "capstan explosion" is dominant over the effect of the weight.

Now the same installation is done using a partly leaking air or water plug, with a pressure difference of 0.3 bar over it, equivalent to a local pulling force of 1.39 N, amply enough to compensate for the friction at the cable's foremost end. In other words, there is a case using a jetting method (compressed air) with a step of applying a pulling force to the front end of the elongated element, and a second case using the method of the present invention. Jetting+pulling does not improve for the 900 m length see curve J+P on FIG. 4. This surprising result is explained by the fact that at the position that could be reached by jetting helped with the benefit of the increased hydraulic resistance of the duct section with cable, there is already so much excess airflow due to expansion of the fluid, that the airflow can compensate the "capstan explosion" to zero. But floating+pulling (the method according to embodiments of the present invention) is possible now, see FIG. 4, curve F+P. The method according to embodiments of the present invention is now enabling a laying until 5400 m, see FIG. 4, curve F+P. In practice this extreme long length will not be reached, because also the effect occurs of changing the curvature of the (stiff) cable (not the same as when the duct is coiled on a drum or stranded into a helix, where the curvature remains constant over the length) when passing bends and undulations in the duct trajectory, adding to the friction due to the (effective) weight of the cable, see "Floating Cable into Duct: Recent Developments" (W. Griffioen, L. Gapany, S. Grobety, C. Gutberlet, G. Plumettaz, R. van der Sluis, A. Pijpers, Th. Weigel, Proceedings at 62nd IWCS—2013, 11-20), but floating lengths of more than 3 km have already been reached in practice in microducts of similar size. So, the target length of 1200 meters is easily reached, even multiple (cascaded) lengths will be possible.

Figure 5:
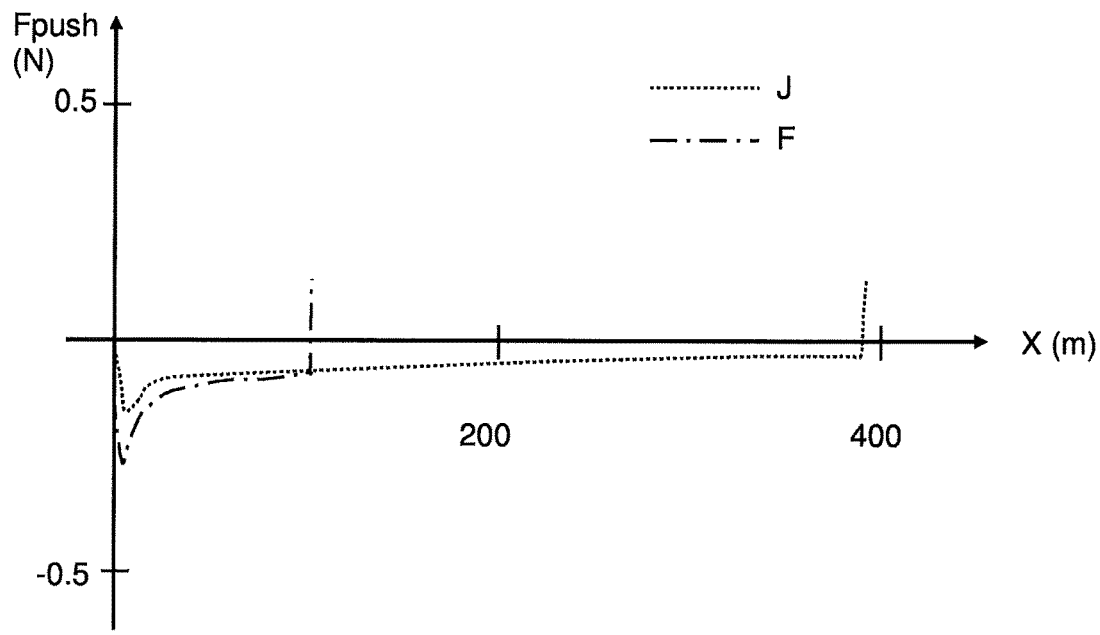
FIG. 5 represents a comparative graph of introduced lengths of an elongated element into a bended duct, using the known jetting and floating methods applied to a second specific example.

Specific Example 2 an optical cable with a diameter of 1.2 mm, a weight of 0.015 N/m (effective weight $W_e$ in water of 0.0039 N/m), a stiffness of 0.001 Nm2 and an intrinsic curvature of 0.4 m has to be installed into one of 5/3.5 mm microducts forming a bundle, which is coiled on a drum with core diameter of 400 mm, i.e. bend radius of 0.2 m. This time the bend radius of the microduct coiled on the drum is the most critical one. The coefficient of friction (COF) is now 0.15. From formula (3) written in the general description, a floating length of 6767 m would be achieved in a straight duct for a pressure of 12 bar. But, from formula (2), the force $F_{head}$ to push the cable head through the continuous bend will be 0.041 N (a length of 70 m of cable would give the same friction due to weight only, but then the cable has already made a cumulative angle of >20000°). This means that $F_{head}/R_b$, reaching a value of 0.21 N/m, is by far exceeding $W_e$. Therefore, from formula (1) a distance of only 129 m would follow. The target installation length is 1000 m, again with a pressure of 12 bar ($\Delta p_{duct}$). In FIG. 5 the result is shown for the microduct open at 390 m, curve J, which is just reached for jetting, but (by far) not for floating (129 m, curve F).

Figure 6:
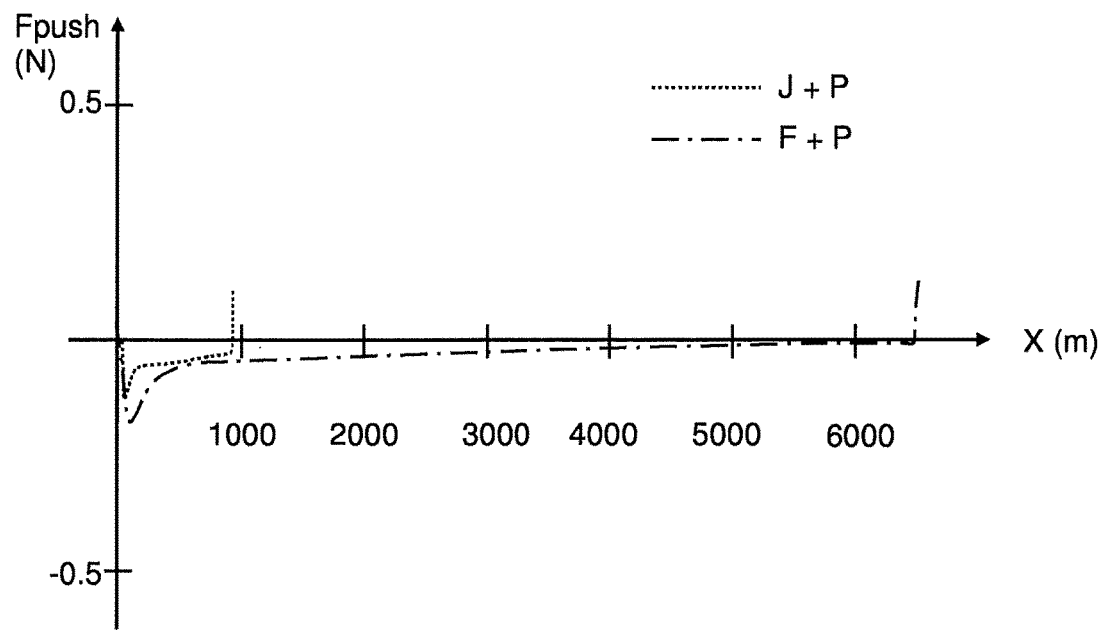
FIG. 6 represents a comparative graph of introduced lengths of the elongated element into the bended duct of the second specific example, using the jetting and floating methods with a step of applying an axial effort to the front end of the elongated element; and, FIGS. 7a & 7b represent a leaking plug used to apply the axial effort required by embodiments of the present invention.

Now the same installation is done using a partly leaking air or water plug, with pressure difference $\Delta p_{head}$ of 0.3 bar over it, equivalent to a local pulling force of 0.29 N, amply enough to compensate for the friction at the cable's foremost end. Jetting+Pulling also improves now (because the benefit of the increased hydraulic resistance was bringing the cable only a short section into the duct) and 950 m can be reached, see FIG. 6, curve J+P. For Floating+Pulling (the present invention), the length of 6597 m (follows from formula (3), with 0.3 bar subtracted from the installation pressure of 12 bar) is amply meeting the target of 1000 m, see FIG. 6, curve F+P. It is then shown that the method of the present invention improves the operating of an elongated element into or out of a bended duct.

Figure 7A:
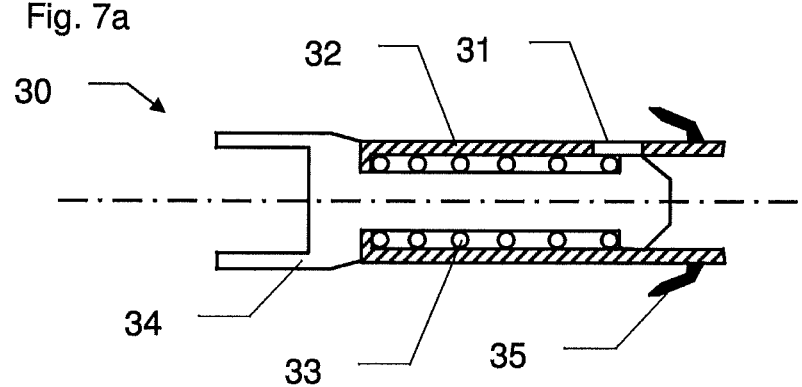

FIG. 7a represents a leaking plug 30 arranged for applying an axial force to a front end of the elongated element 10. The leaking plug 30 comprises a housing 32 with a lip seal 35 and a hole 31, and an axially sliding rod 34 is arranged in the housing 32, with a spring 33 arranged to push the axially sliding rod 34 to close the hole 31. The axially sliding rod 34 presents an attachment interface at its left end, to attach an elongated element.

Figure 7B:
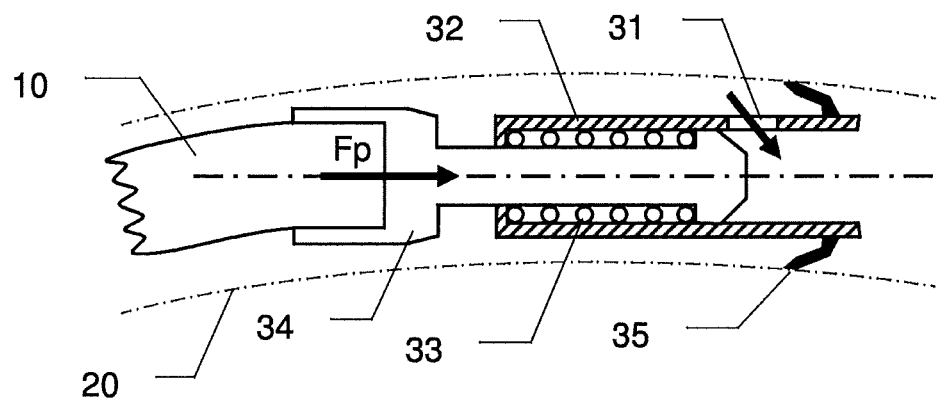

As shown on FIG. 7b, the leaking plug 30 is attached to an elongated element 10 and introduced into a bended duct 20 shown in dotted lines. A liquid is introduced under pressure into the bended duct 20, and the lip seal 35 is forcing the housing 32 to move under the action of the pressure of the liquid. Since there is an elongated element 10 attached to the axially sliding rod 34, the latter is retained and forces the spring 33 to be compressed, so that the hole 31 is opened, to allow the liquid to pass through it, as shown by the arrow. This liquid flow through the hole 31 creates a pressure drop, so that in conjunction with the spring stiffness, a pulling force Fp is applied to the elongated element 10.

Specific Example 3

A 82 mm power cable with 3 solid cores, with a mass of 6.42 kg/m, floated with a concentrated 26% NaCl solution of density 1.2 g/cm3 (almost entirely matching the cable density, resulting in an effective weight $W_e$ of the cable of only 0.81 N/m) and a stiffness B of 12000 Nm2 is floated into a duct with inner diameter $D_d$ of 102.2 mm, with a pressure difference of $\Delta p_{duct}$ of 12 bar all along the duct. The coefficient of friction f between cable and duct is equal to 0.08. The duct is coiled onto a Jumbo drum with minimum bend radius $R_b$ of 1.41 m (worst case). From formula (3) a floating length of 121 km would follow in a straight duct. But, the force $F_{head}$ to push the cable head through the continuous bend will be 6312 N. This means that $F_{head}/R_b$, reaching a value of 4477 N/m, is by far exceeding $W_e$. Therefore, from formula (1) a distance of only 22 m would follow. Because pushing forces are not completely killed by the capstan effect on such relatively short lengths, this will be a little longer.

When using a partly leaking water plug at the end of the cable, with a pressure difference $\Delta p_{head}$ of 8 bar over it, equivalent to a local pulling force amply exceeding 6312 N, the force to push the cable head through the continuous curve is supplied. We can now use formula (3) again to calculate the floating length, with 8 bar subtracted from the installation pressure of 12 bar, resulting in a floating length of still 40 km. The maximum length of duct on the Jumbo drum is 1.9 km, so that this 82 mm power cable should be laid entirely into the duct.

It is understood that obvious improvements and/or modifications for one skilled in the art may be implemented and being under the scope of the invention as it is defined by the appended claims.

The invention claimed is:

1. A method for operating an elongated element through a full length of a bended duct being bended with an effective radius greater than 5° per meter over a major part of the length of the bended duct, the method comprising the steps of:
   introducing a liquid into the bended duct and maintaining predetermined flow and pressure conditions of the liquid into the bended duct,
   compensating a friction between the bended duct and an end of the elongated element being bended by the bended duct, by applying a predetermined effort to the end of the elongated element being bended by the bended duct, wherein the flow of the liquid is set to achieve a flowing speed of the liquid into the bended duct greater than a travelling speed of the elongated element into the bended duct; and
   helically stranding the bended duct with a cable or another duct to form a stranded element, before operating the elongated element into the bended duct.

2. The method as claimed in claim 1, wherein the step of applying the predetermined effort is achieved by the steps of:
   attaching a leaking plug to the end of the elongated element,
   causing a pressure drop to the liquid flow at the leaking plug level, by establishing a calibrated leak of liquid through the leaking plug.

3. The method as claimed in claim 1, wherein the predetermined effort is adjusted in relation to at least one factor selected from the group consisting of: the bending of the bended duct and a bending stiffness of the elongated element.

4. The method as claimed in claim 1, wherein the predetermined effort is adjusted in relation to a position of the end of the elongated element in the bended duct.

5. The method as claimed in claim 1, wherein the method is a method of laying the elongated element into the bended duct, wherein the end of the elongated element is a front end of the elongated element, introduced first in an entry of the bended duct, and wherein the predetermined effort is a pulling effort.

6. The method as claimed in claim 5, wherein the predetermined pulling effort is set with a leaking plug presenting a pressure drop $\Delta p_{head}$ set in relation to the friction/repulsion force at the cable head caused by bending of the stiff, initially straight, cable into the bended duct, so as to respect the following formula:

$$f\sqrt{W_e^2 + \frac{F_{head}^2}{R_b^2}} - \frac{\pi D_c D_d}{4}\frac{\Delta p_{duct}}{l} \leq 0; \quad (1)$$

where:

$$F_{head} = F_{frictionhead} - F_{pull} \text{ when } F_{pull} < F_{frictionhead}; \quad (2a)$$

$$F_{head} = 0 \text{ when } F_{pull} > F_{frictionhead}; \quad (2b)$$

$$F_{pull} = \frac{\pi D_d^2}{4}\Delta p_{head}; \quad (3)$$

with $F_{pull}$ being the predetermined pulling effort, $F_{frictionhead}$ the friction/repulsion force at the cable head, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between the elongated element and the bended duct, $\Delta p_{head}$ the pressure drop at the leaking plug, B the stiffness of the elongated element and $R_b$ the bend-radius of the bended duct.

7. The method as claimed in claim 5, wherein the predetermined pulling effort is set with a leaking plug presenting a pressure drop $\Delta p_{heed}$ set in relation to the bending of the duct and in relation to the bending stiffness of the elongated element, with respect to the following formula:

$$f\sqrt{W_e^2 + \frac{F_{head}^2}{R_b^2}} - \frac{\pi D_c D_d}{4}\frac{\Delta p_{duct}}{l} \leq 0; \quad (1)$$

where:

$$F_{head} = F_{frictionhead} - F_{pull} \text{ when } F_{pull} < F_{frictionhead}; \quad (2a)$$

$$F_{head} = 0 \text{ when } F_{pull} > F_{frictionhead}; \quad (2b)$$

$$F_{frictionhead} = \frac{2Bf}{\sqrt{6(D_d - D_c)R_b^3}} + \frac{B}{2R_b^2}; \quad (3a)$$

$$F_{pull} = \frac{\pi D_d^2}{4}\Delta p_{head}; \quad (3b)$$

with $F_{pull}$ being the predetermined pulling effort, $F_{frictionhead}$ a friction/repulsion force at the cable head, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

8. The method as claimed in claim 4, wherein the method is a method of laying the elongated element out of the bended duct, wherein the end of the elongated element is a rear end of the elongated element, last laid out of the bended duct, and wherein the predetermined effort is a pushing effort.

9. The method as claimed in claim 8, wherein the predetermined pushing effort is set with a leaking plug presenting a pressure drop $\Delta p_{heed}$ set in relation to the friction/propulsion force at the cable rear end caused by unbending of the stiff, initially straight, cable through the bended duct, with respect to the following formula:

$$f \sqrt{W_e^2 + \frac{F_{head}^2}{R_b^2}} - \frac{\pi D_c D_d}{4} \frac{\Delta p_{duct}}{l} \leq 0; \quad (10)$$

where:

$$F_{head} = F_{frictionrear} - F_{push} \text{ when } F_{push} < F_{frictionrear}; \quad (12a)$$

$$F_{head} = 0 \text{ when } F_{push} > F_{frictionrear}; \quad (12b)$$

$$F_{push} = \frac{\pi D_d^2}{4} \Delta p_{head}; \quad (13)$$

with $F_{push}$ being the predetermined pushing effort, $F_{frictionrear}$ the friction/propulsion force at the cable rear end, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

10. The method as claimed in claim 8, wherein the predetermined pushing effort is set with a leaking plug presenting a pressure drop $\Delta p_{head}$ set in relation to the bending of the duct and in relation to the bending stiffness of the elongated element, with respect to the following formula:

$$f \sqrt{W_e^2 + \frac{F_{head}^2}{R_b^2}} - \frac{\pi D_c D_d}{4} \frac{\Delta p_{duct}}{l} \leq 0; \quad (10)$$

where:

$$F_{head} = F_{frictionrear} - F_{push} \text{ when } F_{push} < F_{frictionrear} \quad (12a)$$

$$F_{head} = 0 \text{ when } F_{push} > F_{frictionrear} \quad (12b)$$

$$F_{frictionrear} = \frac{2Bf}{\sqrt{6(D_d - D_c)R_b^3}} - \frac{B}{2R_b^2}; \quad (13a)$$

$$F_{push} = \frac{\pi D_d^2}{4} \Delta p_{head} \quad (13b)$$

with $F_{push}$ being the predetermined pushing effort, $F_{frictionrear}$ the friction/propulsion force at the cable rear end, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

11. A method for operating an elongated element through a full length of a bended duct being bended with an effective radius greater than 5° per meter over a major part of the length of the bended duct, the method comprising the steps of:
  introducing a liquid into the bended duct and maintaining predetermined flow and pressure conditions of the liquid into the bended duct,
  compensating a friction between the bended duct and an end of the elongated element being bended by the bended duct, by applying a predetermined effort to the end of the elongated element being bended by the bended duct, wherein the flow of the liquid is set to achieve a flowing speed of the liquid into the bended duct greater than a travelling speed of the elongated element into the bended duct; and
  coiling the bended duct onto a drum to bend the bended duct over its length, before operating the elongated element into the bended duct.

12. The method as claimed in claim 1, comprising an initial step of bending the bended duct with an effective radius greater than 20° per meter of bended duct.

13. The method as claimed in claim 11, wherein the step of applying the predetermined effort is achieved by the steps of: attaching a leaking plug to the end of the elongated element, causing a pressure drop to the liquid flow at the leaking plug level, by establishing a calibrated leak of liquid through the leaking plug.

14. The method as claimed in claim 11, wherein the predetermined effort is adjusted in relation to at least one factor selected from the group consisting of: the bending of the bended duct and a bending stiffness of the elongated element.

15. The method as claimed in claim 11, wherein the predetermined effort is adjusted in relation to a position of the end of the elongated element in the bended duct.

16. The method as claimed in claim 11, wherein the method is a method of laying the elongated element into the bended duct, wherein the end of the elongated element is a front end of the elongated element, introduced first in an entry of the bended duct, and wherein the predetermined effort is a pulling effort.

17. The method as claimed in claim 16, wherein the predetermined pulling effort is set with a leaking plug presenting a pressure drop $\Delta p_{head}$ set in relation to the friction/repulsion force at the cable head caused by bending of the stiff, initially straight, cable into the bended duct, so as to respect the following formula:

$$f \sqrt{W_e^2 + \frac{F_{head}^2}{R_b^2}} - \frac{\pi D_c D_d}{4} \frac{\Delta p_{duct}}{l} \leq 0; \quad (1)$$

where:

$$F_{head} = F_{frictionhead} - F_{pull} \text{ when } F_{pull} < F_{frictionhead}; \quad (2a)$$

$$F_{head} = 0 \text{ when } F_{pull} > F_{frictionhead}; \quad (2b)$$

$$F_{pull} = \frac{\pi D_d^2}{4} \Delta p_{head}; \quad (3)$$

with $F_{pull}$ being the predetermined pulling effort, $F_{frictionhead}$ the friction/repulsion force at the cable head, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between the elongated element and the bended duct, $\Delta p_{head}$ the pressure drop at the leaking plug, B the stiffness of the elongated element and $R_b$ the bend-radius of the bended duct.

18. The method as claimed in claim 16, wherein the predetermined pulling effort is set with a leaking plug presenting a pressure drop $\Delta p_{head}$ set in relation to the bending of the duct and in relation to the bending stiffness of the elongated element, with respect to the following formula:

$$f\sqrt{W_e^2 + \frac{F_{head}^2}{R_b^2}} - \frac{\pi D_c D_d}{4} \frac{\Delta p_{duct}}{l} \leq 0; \quad (1)$$

where:

$$F_{head} = F_{frictionhead} - F_{pull} \text{ when } F_{pull} < F_{frictionhead}; \quad (2a)$$

$$F_{head} = 0 \text{ when } F_{pull} > F_{frictionhead}; \quad (2b)$$

$$F_{frictionhead} = \frac{2Bf}{\sqrt{6(D_d - D_c)R_b^3}} + \frac{B}{2R_b^2}; \quad (3a)$$

$$F_{pull} = \frac{\pi D_d^2}{4} \Delta p_{head}; \quad (3b)$$

with $F_{pull}$ being the predetermined pulling effort, $F_{frictionhead}$ a friction/repulsion force at the cable head, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

19. The method as claimed in claim 11, wherein the method is a method of laying the elongated element out of the bended duct, wherein the end of the elongated element is a rear end of the elongated element, last laid out of the bended duct, and wherein the predetermined effort is a pushing effort.

20. The method as claimed in claim 19, wherein the predetermined pushing effort is set with a leaking plug presenting a pressure drop $\Delta p_{head}$ set in relation to the friction/propulsion force at the cable rear end caused by unbending of the stiff, initially straight, cable through the bended duct, with respect to the following formula:

$$f\sqrt{W_e^2 + \frac{F_{head}^2}{R_b^2}} - \frac{\pi D_c D_d}{4} \frac{\Delta p_{duct}}{l} \leq 0; \quad (10)$$

where:

$$F_{head} = F_{frictionrear} - F_{push} \text{ when } F_{push} < F_{frictionrear}; \quad (12a)$$

$$F_{head} = 0 \text{ when } F_{push} > F_{frictionrear}; \quad (12b)$$

$$F_{push} = \frac{\pi D_d^2}{4} \Delta p_{head}; \quad (13)$$

with $F_{push}$ being the predetermined pushing effort, $F_{frictionrear}$ the friction/propulsion force at the cable rear end, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

21. The method as claimed in claim 16, wherein the predetermined pushing effort is set with a leaking plug presenting a pressure drop $\Delta p_{head}$ set in relation to the bending of the duct and in relation to the bending stiffness of the elongated element, with respect to the following formula:

$$f\sqrt{W_e^2 + \frac{F_{head}^2}{R_b^2}} - \frac{\pi D_c D_d}{4} \frac{\Delta p_{duct}}{l} \leq 0; \quad (10)$$

where:

$$F_{head} = F_{frictionrear} - F_{push} \text{ when } F_{push} < F_{frictionrear} \quad (12a)$$

$$F_{head} = 0 \text{ when } F_{push} > F_{frictionrear} \quad (12b)$$

$$F_{frictionrear} = \frac{2Bf}{\sqrt{6(D_d - D_c)R_b^3}} - \frac{B}{2R_b^2}; \quad (13a)$$

$$F_{push} = \frac{\pi D_d^2}{4} \Delta p_{head} \quad (13b)$$

with $F_{push}$ being the predetermined pushing effort, $F_{frictionrear}$ the friction/propulsion force at the cable rear end, $D_d$ the inner diameter of the bended duct, $D_c$ the diameter of the elongated element, l the length of the bended duct, $\Delta p_{duct}$ the pressure drop over the total length of the duct, $W_e$ the effective weight of the elongated element (in the liquid) per unit of length, f the coefficient of friction between elongated element and bended duct, $\Delta p_{head}$ the pressure drop at the leaking plug, B the stiffness of the elongated element and $R_b$ the bend-radius of the bended duct.

22. The method as claimed in claim 11, comprising an initial step of bending the bended duct with an effective radius greater than 20° per meter of bended duct.

\* \* \* \* \*